Oct. 28, 1952 J. L. BOYER 2,616,064
MAGNETICALLY CONTROLLED RECTIFIER-TUBE
Filed March 30, 1951 2 SHEETS—SHEET 1

INVENTOR
John L. Boyer.
BY *Q. B. Buchanan*
ATTORNEY

Oct. 28, 1952  J. L. BOYER  2,616,064
MAGNETICALLY CONTROLLED RECTIFIER-TUBE
Filed March 30, 1951  2 SHEETS—SHEET 2

WITNESSES:
Robert C. Baird
W. L. Groons

INVENTOR
John L. Boyer.
BY O. B. Buchanan
ATTORNEY

Patented Oct. 28, 1952

2,616,064

UNITED STATES PATENT OFFICE 2,616,064

MAGNETICALLY CONTROLLED RECTIFIER-TUBE

John L. Boyer, Pittsburgh, Pa., assignor to Westinghouse Electric Corporation, East Pittsburgh, Pa., a corporation of Pennsylvania Application March 30, 1951, Serial No. 218,368

12 Claims. (Cl. 315—195)

My invention relates to delayed-firing gaseous-discharge rectifying tubes or devices, in which electromagnet-means are provided for at times establishing an arc-blocking magnetic field transversely across an intermediate arcing-space through which the arc must pass in playing between the anode and the cathode of the tube.

Magnetically controlled rectifying tubes have been known before, in which a discharge-blocking electromagnet has been energized with a pulsating unidirectional current for permitting an arc or discharge to form within the tube only during the periods when the electromagnet was deenergized, thus controlling the delayed firing of the tube. However, these magnetically controlled tubes, as previously known, have not operated satisfactorily, and in fact the operation has been so poor that most of these tubes are no longer listed by the principal tube-manufacturers; most controlled tubes having been long since standardized, in favor of the grid-controlled types. The principal disadvantage of magnetically controlled tubes, as heretofore known, has been due to the fact that the time constant of the electromagnet is in general of the same order as, and usually considerably larger than, the time-delays which are involved in the controlled delayed firing of the tube, whereby the conductive periods of the tube shall be timed at predetermined phase-angles after the commencement of the positive half-wave of voltage in which the tube is to conduct current.

It is the principal object of my present invention to go back to the discarded idea of magnetically controlled tubes, and to provide means whereby the strength of the electromagnet-field is reduced from an effective arc-blocking value to substantially zero at a rate of decrease which is considerably higher than the rate of decrease of the voltage at the end of each half-cycle in the main alternating-current circuit from which the rectifier is energized. There are many means for bringing about this sharp cutoff of the magnetic field of the electromagnet, most of these means being adaptations of means and circuits which are already known in other uses or applications.

My invention consists partly in various adaptations of various quick-cutoff means, but more basically, my invention relates to the new method of magnetic control wherein a quick-cutoff means or circuit is interposed between the alternating or pulsating-current source of energy for the electromagnet and the electromagnet itself, so as to cause the electromagnet to be able to lose its flux at a much higher percentage-rate than the percentage-rate of change of the line-voltage at the beginning or end of any half-cycle. In this way, I give my magnetically controlled tubes the sharply defined, and definite, delayed-firing control, which occurs at the instant when the electromagnet loses its flux, thereby ranking the electromagnetic control in efficiency and dependability comparable to the standard grid-controlled tubes.

While my invention is applicable to any delayed-firing rectifying tubes, which may be of either the hot-cathode type or the cathode-pool type, a probably more important field of application of the invention is in connection with single-anode alkali-metal tubes, either of the cathode-pool type or of the hot-cathode type, wherein the discharge-metal is a metal chosen from the group comprising the three heavier stable light metals of the alkali-metal group, comprising cesium, rubidium and potassium, as more particularly described and claimed in an application of Colaiaco and myself, Serial No. 144,354, filed February 15, 1950, wherein a hot-cathode type of alkali-metal tube is described; and in my application, Serial No. 206,434, filed January 17, 1951, in which a pool type of alkali-metal tube is disclosed.

Electromagnetic delayed-firing control is particularly necessary or advantageous in alkali-metal tubes, because of the unusually great difficulties which are encountered in the provision of a successful electrostatic grid for controlling the initiation of the current-carrying arcs in such tubes. To be effective, a grid, in an alkali-metal tube, should be made of a metal whose work function is lower than the ionization potential of the alkali-metal which is used in the tube; and the grid should also be kept at a relatively low temperature. For example, the ionization potential of cesium is 3.9 volts, and if the metal from which the grid is constructed has a work function higher than 3.9 volts, the grid acts as an electron-emitter, even at temperature as low as 320° C., and thus loses its ability to prevent the initiation of the current-carrying arc in the tube. Metals whose work function is lower than 3.9 volts, such as zinc (3.3 volts), thorium (3.4 volts), calcium (3.2 volts), magnesium (2.4 volts), and others, are relatively impractical for grid constructions, for reasons of cost, availability, weak structural strength and high vapor-pressures at degassing temperatures and at operating temperatures, and other difficulties. The other alkali-metals, rubidium and potassium, also have low ionization potentials, which are 4.2 and 4.3 volts, respectively. In order to obtain the same advantages which are provided by grid-control in other tubes, it is particularly desirable, therefore, in an alkali-metal tube, to use an electromagnetic field-control, with the improvements which are embodied in my present invention.

With the foregoing and other objects in view, my invention consists in the circuits, systems, combinations, structures, parts, and methods of design and operation, which are shown in the accompanying drawings, wherein.

Figure 5:
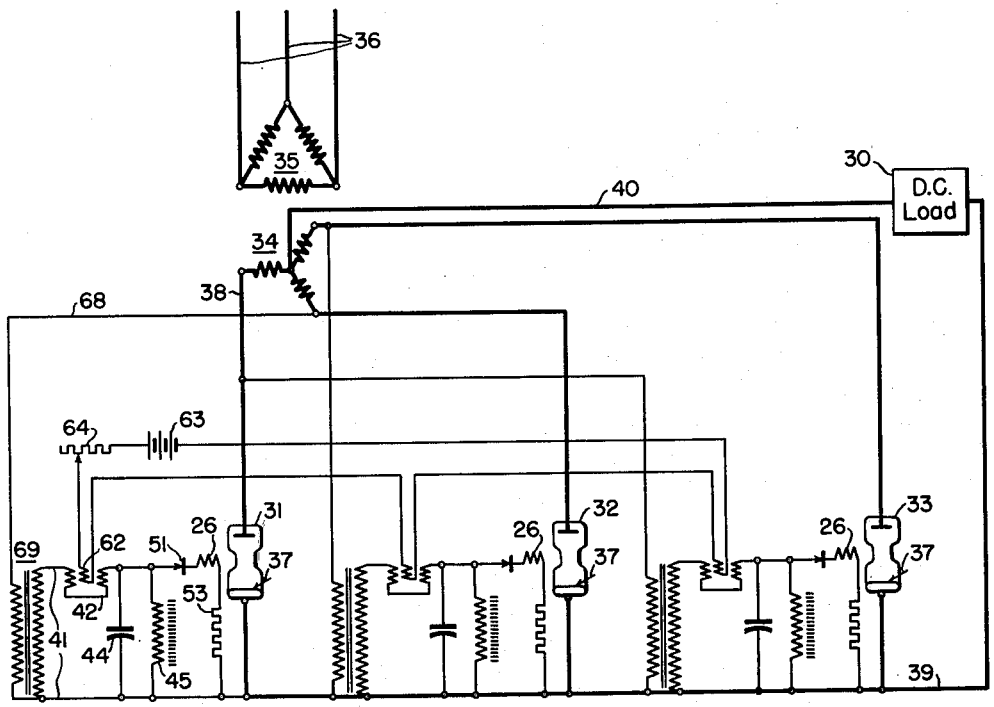
Figure 6:
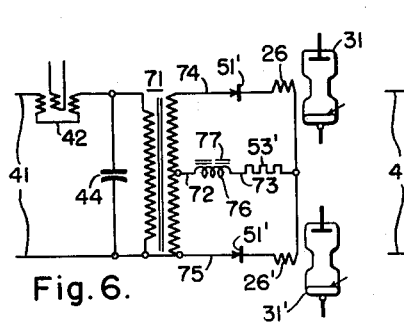
Figure 7:
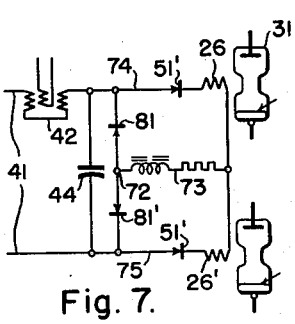
Figure 8:
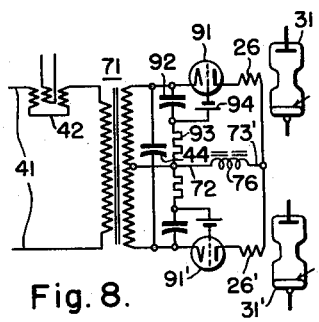

Fig. 5 is a diagrammatic view of circuits and apparatus showing both the main power-circuits and the electromagnet control-circuits of an exemplary form of my invention as applied to a three-phase rectifier-system, the tubes being diagrammatically indicated as dumbbell-shaped pool-type tubes, which are intended to be symbolic of any gaseous-discharge tubes to which the invention may be applied, and Figs. 6, 7 and 8 are wiring-diagrams showing alternative forms of electromagnet control-systems.

Figure 1:
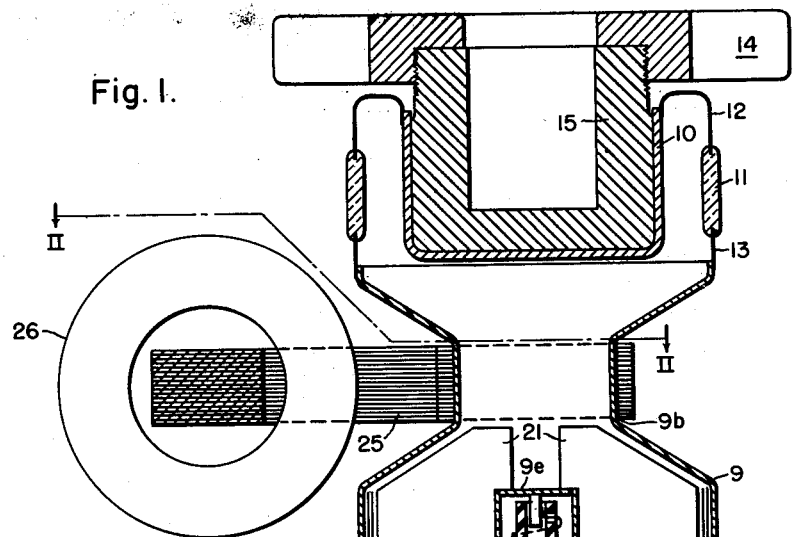
Figure 1 is a somewhat diagrammatic and simplified vertical sectional view of a hot-cathode alkali-metal tube embodying my invention, the cross-section being taken on the line I—I of Fig. 2.

The alkali-metal tube which is shown, by way of example, in Fig. 1, is of the hot-cathode type, with an air-cooled anode. The tube comprises an evacuated enclosure-means or container, most of which is made up of a metal cathode-portion 9 having cylindrical side-walls 9a, surmounted by a constricted portion 9b which provides an intermediate arcing space of restricted cross-section, through which the arc must play in carrying the load-current of the rectifier. The cathode container-portion 9 has a bottom part 9c which is provided with a centrally disposed upstanding re-entrant tube-portion 9d having a closed upper end 9e.

The upper end of the evacuated container of the tube in Fig. 1 consists of a downwardly extending cup-shaped metal anode portion 10, which is joined to the top of the cathode-portion 9 of the container by means of a cylindrical glass or other insulating member 11, and metal-spinnings 12 and 13 which are connected seal-tight between the cylindrical insulator 11 and the anode and cathode parts 10 and 9, respectively. The anode is illustrated as being of a type which is cooled by means of cooling-fins 14 which are carried by a massive copper cup-member 15 which fits down into the cup-shaped anode-member 10, in good thermal and electrical contact therewith, so that the anode is directly cooled by radiation to the ambient atmosphere.

The lower cylindrical walls 9a of the cathode-portion 9 of the evacuated container are also cooled by being exposed to the ambient atmosphere, the cooling-rate of this cathode cylindrical wall 9a being such that said wall is preferably cooled to a lower temperature than either the anode 10 or the insulating seal 12—11—13, so that the metal-vapor condensation occurs only on the cylindrical cathode-walls 9a, at a condensation-temperature which is usually of the order of from 160 to 250° C., more or less. The tube contains a small quantity of a discharge-metal selected from the group comprising cesium, rubidium and potassium, the quantity of this metal being too small to be shown conveniently in a drawing of the small scale of Fig. 1.

The re-entrant cathode-tube 9d is heated to a temperature of the order of 700 or 800° C., by means of a cathode-heater 16 which is disposed within said re-entrant cathode-tube 9d, being illustrated as being held hermetically sealed within said re-entrant cathode tube, by means of a vacuum-tight bottom-plug 17 having an insulating seal 18 for bringing out the heater-lead 19.

It is practically necessary, in the illustrated type of hot-cathode alkali-metal tube, as shown in Fig. 1, for the hot-cathode surface-area to be quite large, without permitting the cathode to occupy an unreasonably large space. To this end, the heated re-entrant cathode-tube 9d is provided with a large number of outwardly extending cathode fins 21, which are connected to the outer surface of the re-entrant cathode-tube 9d, in good thermal and electrical contact therewith. These cathode-fins 21 practically fill the lower cylindrical portion 9a of the cathode-part of the container. The heat-loss from the cathode-fins 21 to the cooled parts of the cathode container-portion 9 is usually reduced by means of thin spaced metal heat-shields 22 and 23, which are suitably supported within the container, as described and claimed in the previously-mentioned copending application of Colaiaco and myself.

Figure 2:
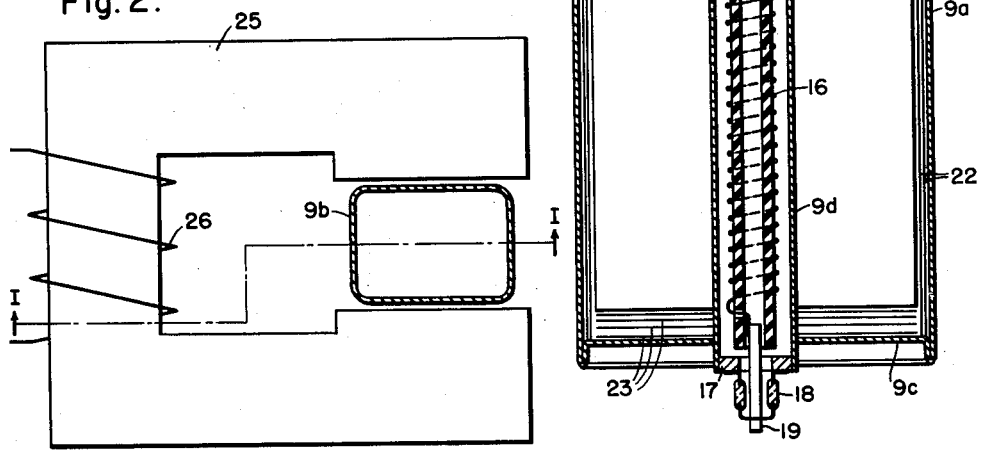
Fig. 2 is a plan view of the electromagnet, showing a transverse section of the tube on the line II—II of Fig. 1.

In accordance with my invention, the constricted portion 9b of the envelope, between the anode 10 and the cathode-fins 21, is placed between the poles of an electromagnet 25, which is provided with a laminated core in order to decrease its time-constant which is effective during the increasing and decreasing of its flux. The disposition of the magnet-poles on opposite sides of the restricted section 9b is shown in Fig. 2. The electromagnet 25 is provided with an energizing coil 26, which may be energized in any one of a number of different ways, some of which are shown in Figs. 4 to 8, by way of example; the underlying principle of the coil-energization being that the electromagnet-coil 26 should be connected in such a circuit that the electromagnet reduces its magnetic field to zero very rapidly, when the coil is deenergized, more rapidly than the percentage-rate of decay of the alternating-current line-voltage near the end of any half-cycle. To avoid short-circuiting the magnetic flux of the electromagnet 25, I prefer to use stainless steel or other substantially non-magnetic material for the evacuated container 9, or for the constricted portion 9b thereof, as is well known in magnetically controlled arc-devices.

Fig. 5 shows one way of energizing the electromagnet-coil 26, in accordance with the invention. Fig. 5 shows a simple three-phase rectifier-system, in which a direct-current load 30 is energized through three magnetically controlled rectifiers 31, 32 and 33 from the star-connected secondary winding 34 of a transformer having a primary winding 35 which is energized from a three-phase supply-line 36. The rectifiers 31, 32 and 33 are diagrammatically indicated, in Fig. 5, in a manner which is intended to represent any magnetically controlled gaseous-discharge-rectifier, whether of the filamentary-cathode or vapor-arc type, and if vapor-arc, whether mercury-vapor, alkali-metal vapor, or other vapor; and if alkali-metal vapor, whether of the pool type or of the hot-cathode type which is shown in Fig. 1. In order to show something which is representative of a rectifier in Fig. 5, I have indicated the rectifiers 31, 32 and 33 as if they were single-anode cathode-pool rectifiers, which would necessarily, therefore, be provided with some sort of make-alive device or keep-alive device, which is diagrammatically indicated at 37.

Each of the rectifiers 31, 32 and 33 in Fig. 5 is illustrated as comprising a restricted intermediate section which is under the influence of a magnetic field which may be produced by the electromagnet-coil 26.

In Fig. 5, in accordance with a well-known rectifier-circuit, the anodes of the respective rectifiers are energized from the respective terminals of the star-connected secondary winding 34, as indicated at 38; while the three cathodes are connected together in a common circuit 39 which constitutes the positive supply-lead for the direct-current load 30. The negative return-lead for the direct-current load is brought back to the secondary neutral, as indicated by the conductor 40.

In all of the forms of embodiment of my invention, the electromagnet which is diagrammatically represented by the coil 26 is energized by a special energizing-circuit which gives the electromagnet a low time-constant, or a steep-wave-front characteristic, by which I mean the ability to decrease its flux from a discharge-blocking field-intensity to substantially zero in a time which is small compared to the percentage-rate of increase of the line-voltage at the end of each positive half-cycle.

In the particular form of embodiment of my invention which is shown in Fig. 5, the steep-wave-front electromagnet-energizing means includes the combination of an alternating-current electromagnet-supplying circuit 41, a phase-controlling means, such as a serially connected variable inductance 42, and a square-wave voltage-producing means energized thereby; said square-wave voltage-producing means being illustrated, in Fig. 5, as a capacitor 44 and a saturable inductor 45, both connected in parallel across the phase-controlled electromagnet-supplying circuit. The saturable inductor 45 has a magnetic circuit of a type which has a sharply defined saturation-point in its saturation-curve, and the relative sizes of the capacitor 44 and the saturable inductor 45 are such that the inductor requires something like (usually a little less than) a half-cycle of the electromagnet-supplying circuit, to change its magnetization from substantially zero to the saturation-point in either polarity.

Figure 4:
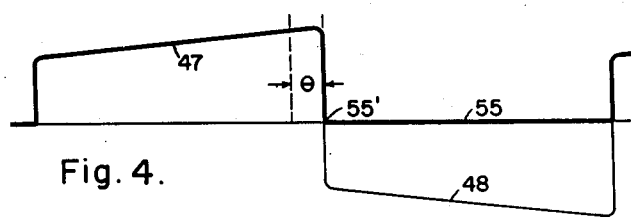
Fig. 4 is a curve-diagram showing the square-topped alternating voltages, and the square-topped pulsating unidirectional currents, which are obtained in one phase of the magnetic control-circuits which are used in the three-phase system of Figs. 3 and 5.

Thus, when the saturating inductor 45 begins to saturate, it completes its saturation very rapidly, thereby reducing its impedance to an extremely low value, which short-circuits the capacitor 44, thereby drawing a still larger exciting-current, and reducing the terminal-voltage of the capacitor to zero in an extremely short time. This is timed so that it occurs at, or just before, the occurrence of a zero-voltage condition in the circuit which supplies the capacitor 44 with line-frequency alternating-current energy. The line-frequency supply-voltage passes through its zero point, and begins to build up in the negative direction, at about the time when the capacitor overshoots, in its discharge-action, and builds up a charge in the opposite direction, so that the now demagnetized or unsaturated inductor 45 begins to build up its flux in the opposite direction, repeating the half-cycle saturation-process. The result is a flat-wave voltage-curve, across the terminals of the capacitor 44, somewhat as indicated in Fig. 4 by the flat-topped alternating-current wave 47—48—49.

The electromagnet-coil 26, in Fig. 5, is connected across the square-wave voltage-producing terminals of the capacitor 44 by a coil-energizing circuit which serially includes a half-wave rectifier 51 of a type which becomes conducting substantially as soon as its impressed voltage becomes positive in the conducting polarity. In this way, the coil receives a unidirectional pulsating energization, or square-topped half-waves of only one polarity.

The electromagnet would still have far too long a time-constant, even when energized from a substantially square-topped voltage-wave, if some special circuit-connection were not used, to reduce this time-constant. In Fig. 5, this means, which is used for reducing the time-constant of the electromagnet, is a large resistance 53, which is connected in series with the electromagnet-coil 26, or built into the coil itself, so that the serially included resistance, in the coil-energizing circuit, is at least about twice as large as the supply-frequency inductance of the coil 26. By making the coil-circuit resistance 53 as large as may be necessary, the time-constant of the electromagnet can be made quite small, so that its current, and hence its magnetic flux, will follow substantially the same wave-form as the impressed voltage, which is the voltage across the terminals of the capacitor 44. In Fig. 4, therefore, the heavy-line flat-topped intermittent or pulsating-wave current of the electromagnet-coil 26 can be represented by a curve 47—55—49, wherein the zero portion 55 of the curve represents the coil-current during the nonconducting period of the serially connected rectifier 51. It will be noted that the half-cycle current-pulsations 47 and 49 have a steeper-than-sinusoidal change-rate at both the beginning and the end of each half-wave current-pulse.

It will be noted that the square-wave voltage-generator, which is produced, in effect, by the parallel-connected capacitor 44 and the saturable inductor 45, operates by a tuning or adjustment of the relative magnitudes of the capacitive impedance or the charging-current which is drawn by the capacitor 44 and the nonsaturated inductive impedance or the magnetizing current which is drawn by the inductor 45 before its saturation-point has been reached. In order to keep this combination of capacitive and inductive reactances operating properly, it is necessary that the amount of energy which is stored by the capacitor 44 during each half-cycle shall be large as compared to the amount of energy which is drawn off by the half-wave coil-circuit of the electromagnet-coil 26. Preferably, this capacitor-stored energy, during each half cycle, should be at least four times larger than the amount of energy which is drawn by the coil-energizing circuit during each half-wave, while the coil 26 is receiving energy from the terminals of the capacitor 44.

While any suitable time-phase adjusting-means may be used, as shown at 42 in Fig. 5, the most practical form of device for this purpose is a phase-shifting reactor 42, which is a controllably saturated inductance having a unidirectionally energized saturation-coil 62 which is supplied with a controllable direct-current, as by means of a battery 63 and a rheostat 64, or any other suitable control-means for varying the degree of saturation and hence the inductive impedance of the coil 42. This combination of a variable-impedance coil 42, in series with the capacitor 44, makes a very convenient phase-controlling means, for varying the time-phase of the alternating-current voltage which is impressed upon the terminals of the capacitor 44.

Figure 3:
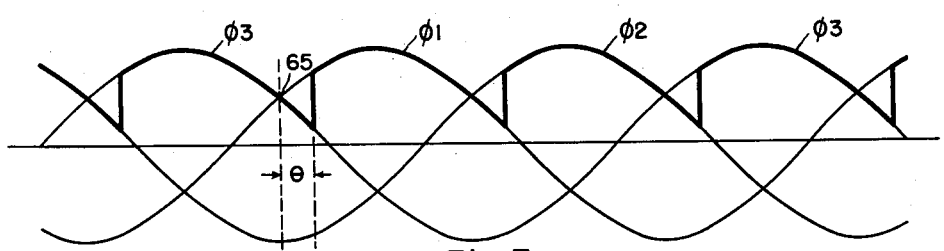
Fig. 3 is a curve-diagram showing the kind of delayed firing which is attained in a common type of three-phase assembly of rectifier tubes, to which my invention is applicable.

Reference to Fig. 3 will show the manner in which a three-phase rectifier of the type shown in Fig. 5 will operate. The sine waves of the three phases of the supply-voltage are shown at $\phi 1$, $\phi 2$ and $\phi 3$, while the conductive periods of the respective tubes are indicated by the heavy-line portion of the curve, which can thus be taken to represent the direct-current output-voltage of the three-phase rectifier-assembly. It will be noted that each rectifier becomes conducting at a certain time-phase angle $\theta$ after the anode of that rectifier becomes positive with respect to the common cathode-circuit. By a variation of the magnitude of this firing-delay angle $\theta$, the average value of the direct-current output-voltage can be controlled in a well-known manner, this being the object of controllably delayed firing.

Fig. 4 is related to Fig. 3 in showing the relative time-phase of the electromagnet current 47—55—49 which energizes the electromagnet-coil 26 for the phase-1 rectifier 31, so that said phase-1 rectifier begins conducting at the terminal of the delayed-firing time-period or angle $\theta$. Thus, as long as the electromagnet coil 26 is energized, as indicated by the heavy-line, current half-wave 47 in Fig. 4, the phase-1 rectifier 31 can not become conducting, even after its anode becomes more positive than its cathode, as it does at the crossover point 65 which marks the beginning of the time-period during which the delayed-firing angle $\theta$ is being counted. As soon, however, as the electromagnet-coil current becomes zero, as indicated by the point 55' of the curve in Fig. 3, this phase-1 rectifier 31 fires, and it continues to carry current until its current is transferred over to the next rectifier 32, as indicated by the heavy portion of the curve $\phi 2$ in Fig. 3. It is to be noted that the very steep current-reduction vertical line, which defines the firing-point 55' in Fig. 4, is an important characteristic of my invention, by reason of which it becomes possible for me to successfully use magnetic firing-control in a manner which gives definite, positive, and accurate control of the firing-angle $\theta$.

In Fig. 5, because of the variable time-delay or phase-angle which is introduced by the variable inductor 42, it is necessary to select, for the phase-1, electro magnet-supplying circuit 41, a line-frequency voltage-source which leads the phase of the anode-voltage $\phi 1$ which is applied to the phase-1 rectifier 31. Any suitable advanced-phase electromagnet-energizing voltage could be used; by way of example, I have chosen a voltage which leads the phase-1 anode-voltage by 120 electrical degrees, as indicated in Fig. 5 by the conductor 68, which is used to energize an auxiliary transformer 69 which energizes the electromagnet-supplying circuit 41.

The electromagnet-supplying circuits which are shown in Fig. 5 are only exemplary of a number of different kinds of circuits which will perform the general function of causing the electromagnet to have a steep-wave front discharge-characteristic, whereby it decreases its magnetic flux or field, from an effective arc-blocking value to substantially zero, at a rate of decrease which is very fast and sharp, or considerably higher than the percentage-rate of decrease of the voltage at the end of each half-cycle in the main alternating-current supply-circuit. Several alternative forms of equivalently functioning electromagnet-supplying circuits are shown in Figs. 6, 7 and 8, respectively.

In Fig. 6, the electromagnet-supplying circuit 41 is shown as being connected, as before, to a capacitor 44, through a variable inductor 42, but the means for causing the capacitor-terminals to produce a succession of substantially square-topped current half-waves 47, 49 in the electromagnet-coil 26 is different, in Fig. 6. In Fig. 6, a transformer 71, or other midtapped inductance-device, is connected across the terminals of the capacitor 44, so that the midtap 72 produces a terminal point for a common return-path circuit 73 for two alternately pulsating unidirectional-current circuits 74 and 75 which are energized from the respective terminals of the capacitor 44. Each of the pulsating unidirectional-current circuits 74 and 75 includes a rectifier 51', which is similar to the rectifier 51 of Fig. 5. At least one of these circuits includes the electromagnet-coil 26 which is to be controlled; or if there are two rectifier tubes, such as 31 and 31', which are to be energized with their anodes 180° out of phase with each other, the electromagnet-coil 26 of one tube can be energized from one pulsating-current circuit, 74, while the electromagnet-coil 26' of the other tube is energized from the other pulsating-current circuit, 75.

In the form of my magnet-energizing means, as shown in Fig. 6, I use a large choke-coil or inductance 76 in the common return-path circuit-part 73 for the two pulsating-current circuits 74 and 75, this inductance being large enough to keep the unidirectional current in this common return-circuit path substantially continuous and constant in magnitude, being preferably substantially ripple-free. Because this inductance 76 is in a direct-current circuit, it must have an air-gap magnetic core, as indicated at 77. This inductance 76 thus constitutes a means for providing whatever large voltage-impulses may be necessary, first in one polarity and then in the other, in order to force the currents which flow in the coils 26 and 26', during alternate half-cycles, to increase practically instantaneously to their full value, at the beginning of each half cycle, to thereafter maintain that value constantly, without change, throughout that half-cycle, and then to decrease substantially instantly to zero, while the current in the other coil is simultaneously increasing, substantially instantaneously, to its full value. In this way, the necessary commutating voltages, or current-forcing voltages, are provided, whereby square-topped current-pulses are produced in the respective electromagnet-coils 26 and 26' of Fig. 6.

In Fig. 6, as in Fig. 5, it is necessary to have a certain amount of resistance in the respective coil-energizing circuits 74 and 75. This is necessary in Fig. 6, in order that the voltage-drop through this resistance may provide the average value of the rectified voltage which is necessary to drive current alternately through the coils 26 and 26', taking into consideration the alternating-current voltage which is required. It is desirable that this circuit-resistance should be quite high, as compared with the circuit-inductance, thereby reducing the burden on the ripple-smoothing inductor 76 which will thus have only the duty of chopping off the peaks of the input-voltage half-waves, and balancing them against the valleys, at the end of one-half cycle and the beginning of the next, when the first voltage quickly falls to zero and the second voltage quickly rises to the value of the average direct-current voltage. It is again desirable, therefore, to have a considerable resistance 53' in the charging-circuit for each of the electromagnet coils 26 and 26'. As shown in Fig. 6, this resistance 53' can conveniently be placed in the common return-path circuit 73, where the same resistance will serve for both of the coils 26 and 26'. It should have about the same magnitude as described for the resistance 53 in Fig. 5.

The coil-energizing circuits in Fig. 6 constitute essentially a full-wave rectifier-system in which the common return-path 73 takes the place of the direct-current load, and in which the return-circuit for the direct-current load is brought back to the midpoint of the transformer secondary which energizes the two rectifiers 51'. The same effect could be produced by a rectifier-bridge arrangement, as shown in Fig. 7, where, instead of using a midtapped transformer 71, we have used two serially connected half-wave rectifiers 81 and 81' which are connected in parallel-circuit relation to the terminals of the capacitor 44 in such polarities as to complete the circuits for the respective unidirectional-current circuits 74 and 75. The rectifiers 81 and 81' are similar to the rectifiers 51'. Otherwise, the circuits of Fig. 7 are the same as in Fig. 6, and the operation is essentially the same.

In Fig. 8, I have shown a different current-forcing means for producing essentially square-topped current-energizations for the half-waves of unidirectional-current pulsations in the two electromagnet-coils 26 and 26' of 180° out-of-phase rectifiers 31 and 31'.

Fig. 8 also shows an expedient which is also applicable to Fig. 6, wherein the capacitor 44 may be connected on either the primary or secondary side of the transformer 71, which is connected across the dephased-voltage terminals which are provided by the input-terminals 41 in series with the variable inductor 42. Neglecting the magnetizing currents of the transformer 71, one circuit is the equivalent of the other, whether the capacitor 44 is connected on the primary side or on the secondary side.

In Fig. 8, I use two grid-controlled thyratrons 91 and 91', with delayed-firing grid-control so phased that each tube begins firing at substantially the 90° point, or substantially the point of maximum voltage of the impressed supply-wave. To this end, the grid-circuit of each thyratron, such as 91, is impressed with a 90°-delayed voltage which is provided by means of a shunt-connected phase-splitter comprising a capacitor 92 and a serially connected resistor 93, for overcoming the negative bias of a biasing source 94, so that each thyratron (such as 91) commences firing, or conducting current, substantially 90° after its voltage begins to become positive. A common return-path circuit 73' is provided for the two electromagnet-coils 26 and 26', to connect back to the midpoint 72 of the transformer 71, but in Fig. 8 this common return-path circuit 73 needs to contain only the choke-coil 76, and not the resistor 53' which was described in connection with Fig. 6.

In Fig. 8, since the voltages of the successive positive and negative half-waves of the impressed line-current energy are not rectified until the maximum-voltage point of the curve, the average direct-current output-voltage will be large enough, without the additional voltage-drop in the resistors 53' of Fig. 6. The currents in the electromagnet-coils 26 and 26' of Fig. 8 are commutated at the points of maximum voltage of the respective half-waves, and an equal voltage must be supplied momentarily by the ripple-smoothing inductor 76. The ripple-smoothing inductor 76 thus serves as a current-forcing means for producing substantially square-topped half-waves in the respective electromagnet-coils 26 and 26' of Fig. 8, and prevents a drop in the sum of the currents in the coils 26 and 26' while the voltage of the transformer 71 forces the current to commutate from one coil to the other.

While I have illustrated my invention in several different forms, and have explained its application to rectifiers of different kinds, I desire such illustration and explanation to be construed as merely examples, and not in a limiting sense; as my invention, in its broadest concept, consists in the new combination including any kind of current-forcing means for producing a steep-wave-front excitation-effect in the electromagnet which is used to magnetically control a rectifier. I desire, therefore, that the appended claims shall be accorded the broadest construction consistent with their language.

I claim as my invention:

1. A delayed-firing rectifying device comprising an evacuated container having an anode and a cathode, circuit-lead terminals for a main rectifier-circuit using said rectifying device in transferring electrical energy between a main alternating-current circuit and a main direct-current circuit, said container comprising means for providing an intermediate arcing-space through which the arc must pass in playing between the anode and the cathode, electromagnet-means for at times establishing an arc-blocking magnetic field transversely across said intermediate arcing-space, said electromagnet-means having an energizing coil, and a time-controllable steep-wave-front electromagnet-energizing means for at times unidirectionally energizing said coil in an effective amount which is sufficient to block the play of an arc between the anode and the cathode and for at half-cycle intervals reducing the strength of the electromagnet-field from an effective arc-blocking value to substantially zero at a percentage-rate of decrease which is considerably higher than the percentage-rate of decrease of the voltage at the end of each half-cycle in the main alternating-current circuit, said electromagnet-energizing means being so phased, relative to said main rectifier-circuit, that said electromagnet is deenergized at a predetermined time after said anode becomes positive with respect to said cathode, characterized by said time-controllable steep-wave-front electromagnet-energizing means including the combination of an alternating-current electromagnet-supplying circuit, a phase-controlling means associated therewith, a substantially square-wave voltage-producing means energized thereby, and a coil-energizing circuit energized from said square-wave voltage-producing means, said coil-energizing circuit comprising a serially connected half-wave rectifier and serially included resistance which is at least about twice as large as the supply-frequency inductance of the coil, said serially connected half-wave rectifier being of a type which becomes conducting substantially as soon as its impressed voltage becomes positive in the conducting polarity.

2. The invention as defined in claim 1, characterized by said square-wave voltage-producing means comprising a capacitor and a saturable inductor both connected in parallel across the phase-controlled electromagnet-supplying circuit, said saturable inductor having a sharply defined saturation-point in its saturation-curve, the relative sizes of said capacitor and said saturable inductor being such that said inductor requires something like a half-cycle of the electromagnet-supplying circuit to change its magnetization from substantially zero to the saturation-point in either polarity, and the capacitor being sufficiently large to reactively store, each half-cycle, an amount of energy which is more than four times larger than the amount of energy which is drawn by the coil-energizing circuit during each half-wave when it is energizing the electromagnet-coil.

3. The invention as defined in claim 2, characterized by said phase-controlling means being a controllably saturated inductance, serially connected between said electromagnet-supplying circuit and said square-wave voltage-producing means, said controllably saturated inductance having a saturation-controlling unidirectional-current winding and unidirectional-current means for controllably energizing said saturation-controlling unidirectional-current winding.

4. A delayed-firing rectifying device comprising an evacuated container having an anode and a cathode, circuit-lead terminals for a main rectifier-circuit using said rectifying device in transferring electrical energy between a main alternating-current circuit and a main direct-current circuit, said container comprising means for providing an intermediate arcing-space through which the arc must pass in playing between the anode and the cathode, electromagnet-means for at times establishing an arc-blocking magnetic field transversely across said intermediate arcing-space, said electromagnet-means having an energizing coil, and a time-controllable steep-wave-front electromagnet-energizing means for at times unidirectionally energizing said coil in an effective amount which is sufficient to block the play of an arc between the anode and the cathode and for at half-cycle intervals reducing the strength of the electromagnet-field from an effective arc-blocking value to substantially zero at a percentage-rate of decrease which is considerably higher than the percentage-rate of decrease of the voltage at the end of each half-cycle in the main alternating-current circuit, said electromagnet-energizing means being so phased, relative to said main rectifier-circuit, that said electromagnet is deenergized at a predetermined time after said anode becomes positive with respect to said cathode, characterized by said time-controllable steep-wave-front electromagnet-energizing means including the combination of an alternating-current electromagnet-supplying circuit, said electromagnet-supplying circuit including a phase-controlling means, a capacitor connected in parallel-circuit relation to said electromagnet-supplying circuit, means energized from the terminals of said capacitor for energizing two alternately pulsating unidirectional-current circuits having a common return-circuit, and means for providing a midpoint connection for said common return-circuit; each of said unidirectional-current circuits serially including a half-wave rectifier, one of said unidirectional-current circuits serially including said electromagnet-coil, and said common return-circuit serially including an inductor of a magnitude sufficient to maintain a fairly constant value of direct-current in said common return-circuit.

5. The invention as defined in claim 4, characterized by said means for providing a midpoint connection being a mid-tapped inductance-device energized in parallel-circuit relation to the terminals of said capacitor.

6. The invention as defined in claim 4, characterized by said means for providing a midpoint connection being the midpoint of two serially connected half-wave rectifiers, each of a type which becomes conducting substantially as soon as its impressed voltage becomes positive in the conducting polarity, said two serially connected half-wave rectifiers being connected in parallel-circuit relation to the terminals of said capacitor in such polarities as to complete the circuits for the respective unidirectional-current circuits.

7. The invention as defined in claim 4, characterized by each of said half-wave rectifiers, in the respective unidirectional-current circuits, being of a type which becomes conducting substantially as soon as its impressed voltage becomes positive in the conducting polarity, and further characterized by the energizing-circuit for said electromagnet-coil having serially included resistance which is at least about twice as large as the supply-frequency inductance of the coil.

8. The invention as defined in claim 7, characterized by the phase-controlling means being associated with the alternating-current electromagnet-supplying circuit.

9. The invention as defined in claim 7, characterized by the phase-controlling means being a controllably saturated inductance, serially connected between said electromagnet-supplying circuit and said capacitor, said controllably saturated inductance having a saturation-controlling unidirectional-current winding and unidirectional-current means for controllably energizing said saturation-controlling unidirectional-current winding.

10. The invention as defined in claim 4, characterized by each of said half-wave rectifiers, in the respective unidirectional-current circuits, being a controlled tube, and controlling-means for causing each of said tubes to become conducting at approximately the maximum-voltage point of its half-wave of impressed voltage from the terminals of said capacitor.

11. The invention as defined in claim 10, characterized by the conduction-commencing time-phase of each of said controlled tubes being substantially fixed, and further characterized by the phase-controlling means being associated with the alternating-current electromagnet-supplying circuit.

12. The invention as defined in claim 10, characterized by the conduction-commencing time-phase of each of said controlled tubes being substantially fixed, and further characterized by the phase-controlling means being a controllably saturated inductance, serially connected between said electromagnet-supplying circuit and said capacitor, said controllably saturated inductance having a saturation-controlling unidirectional-current winding and unidirectional-current means for controllably energizing said saturation-controlling unidirectional-current winding.

JOHN L. BOYER.

REFERENCES CITED

The following references are of record in the file of this patent:

UNITED STATES PATENTS

| Number | Name | Date |
|---|---|---|
| 877,026 | Weintraub | Jan. 21, 1908 |
| 1,164,603 | Jonas | Dec. 14, 1915 |
| 1,177,416 | Jonas | Mar. 28, 1916 |
| 2,038,397 | Weiller | Apr. 21, 1936 |
| 2,376,707 | McCoy | May 22, 1945 |